(12) United States Patent
Repinski

(10) Patent No.: US 10,842,157 B2
(45) Date of Patent: Nov. 24, 2020

(54) METHOD OF PRODUCING PROTEIN CHIP INFUSED WITH MEAT

(71) Applicant: Scott T. Repinski, Milwaukee, WI (US)

(72) Inventor: Scott T. Repinski, Milwaukee, WI (US)

(73) Assignee: Bryon Group LLC, St. Francis, WI (US)

( * ) Notice: Subject to any disclaimer, the term of this patent is extended or adjusted under 35 U.S.C. 154(b) by 172 days.

(21) Appl. No.: 15/870,328

(22) Filed: Jan. 12, 2018

(65) Prior Publication Data

US 2018/0192657 A1 Jul. 12, 2018

Related U.S. Application Data

(60) Provisional application No. 62/445,334, filed on Jan. 12, 2017.

(51) Int. Cl.
| | |
|---|---|
| *A21D 2/34* | (2006.01) |
| *A21D 2/36* | (2006.01) |
| *A21D 2/40* | (2006.01) |
| *A23L 7/13* | (2016.01) |
| *A21D 13/064* | (2017.01) |
| *A23L 13/10* | (2016.01) |
| *A23L 19/18* | (2016.01) |
| *A23P 30/20* | (2016.01) |

(52) U.S. Cl.
CPC .............. *A21D 2/34* (2013.01); *A21D 2/36* (2013.01); *A21D 2/40* (2013.01); *A21D 13/064* (2013.01); *A23L 7/13* (2016.08); *A23L 13/10* (2016.08); *A23L 19/19* (2016.08); *A23P 30/20* (2016.08); *A23V 2002/00* (2013.01); *A23V 2300/16* (2013.01); *A23V 2300/31* (2013.01)

(58) Field of Classification Search
CPC ..................................................... A21D 2/34
See application file for complete search history.

(56) References Cited

U.S. PATENT DOCUMENTS

| | | | | |
|---|---|---|---|---|
| 5,290,584 | A | * | 3/1994 | Ray .................. A23K 50/42 |
| | | | | 426/448 |
| 2017/0188613 | A1 | * | 7/2017 | Rosales .............. A23L 13/03 |

* cited by examiner

*Primary Examiner* — Jenna A Watts
(74) *Attorney, Agent, or Firm* — Quarles & Brady LLP

(57) ABSTRACT

Chips infused with meat are produced according to the disclosed method. The method includes preparing a dough mixture by mixing at least one of a grain component and a vegetable component with water in a mixer and transporting the dough mixture from the mixer into an extruder. In the extruder, a ground meat product is introduced into the dough mixture to form a meat-infused dough mixture which is then extruded and cooked to make the chips. Typically, after extrusion, the meat-infused dough mixture will be cut and fried.

14 Claims, 2 Drawing Sheets

METHOD OF PRODUCING PROTEIN CHIP INFUSED WITH MEAT

CROSS-REFERENCE TO RELATED APPLICATION

This application claims the benefit of U.S. Provisional Patent Application No. 62/445,334 filed on Jan. 12, 2017, which is incorporated by reference herein in its entirety for all purposes.

STATEMENT OF FEDERALLY SPONSORED RESEARCH OR DEVELOPMENT

Not applicable.

TECHNICAL FIELD

This disclosure relates to processes for the production of snack products such as chips and, more specifically, to the production of a high-protein snack product having meat infused therein.

BACKGROUND

Snack foods, such as chips, are widely consumed. Chips are traditionally made from a grain-based dough or sliced potatoes. While the production processes vary based on the particular product and type of chip, for grain-based chips, for example, the chips are typically prepared by forming a grain-based dough into a flat sheet which is then cut and cooked in one or more steps (i.e., cooking in an oven briefly to reduce moisture content followed by deep frying). Then the chips are often salted and/or other types of seasonings are applied to the surface of the chips to introduce additional flavors. Depending on the particular type of chip and ingredients, one having skill in the art will appreciate that the particular details of the steps of the preparation of the dough may vary, the cooking step(s) may vary, and the manner of adding seasoning or other flavors may vary.

To provide new interesting flavors and create different types of chips, some have attempted to add meat products into chips.

However, the addition of meat into the dough presents significant challenges in chip production. Most significantly, the dough has a moisture content which, when combined with meat products, has the potential to cause bacterial growth under the processing conditions for the dough prior to the formation of the dough into chips.

For example, as most dough is prepared it must dwell in a mixer for some length of time (typically, on the order of magnitude of hours) at temperatures at which bacteria growth is promoted (typically, at ambient or room temperature to 110 degrees Fahrenheit depending on the environment in which the production equipment is located). So the introduction of meat into the process creates significant challenges in the routine sanitation of the chip-making equipment and has prevented meat from being introduced into the chip-making process as a substantive constituent of the dough.

SUMMARY

Disclosed herein is a novel and inventive methodology for the creation of a high-protein chip containing meat. As used herein, the term "meat" refers to any variety of animal flesh including, but not limited to, beef or other mammalian meat (e.g., pork, venison, and so forth), poultry (e.g., chicken, turkey, and so forth), and fish (e.g., salmon, tuna, and so forth). In this inventive methodology, the dough mixture is first formed in a mixture and then introduced into an extruder such as, for example, a single screw extruder. Typically, extruders have not been used in the production of grain-based chips. A ground meat product is fed into the dough in the extruder just prior to or at the extruder tool (in some forms, at the entrance of the extruder screw). By introducing the ground meat product at or just before the extruder, the meat can be mixed with the dough mixture in the extrusion screw, for example, just prior to forming a ribbon that is further processed into chips. Among other things, this avoids a lengthy dwell time of the meat at dough production temperatures such as those found in the mixer under conditions in which the presence of meat together with moisture would be problematic to sanitation of the equipment if a meat product was present in the dough at that stage.

According to one aspect of the invention, a method of producing chips infused with meat is provided. A dough mixture is prepared by mixing at least one of a grain component and a vegetable component with water in a mixer. The dough mixture is transported from the mixer into an extruder. In the extruder, a ground meat product is introduced into the dough mixture to form a meat-infused dough mixture. The meat-infused dough mixture is then extruded from the extruder and cooked in one or more ways to make the chips.

The ingredients of the dough mixture and the meat-infused dough mixture can take on various forms and permutations. For example, it is contemplated that the ground meat product may include one or more of beef, pork, poultry, and fish. If there is a grain component in the dough mixture, then the grain component(s) may include one or more of rice, sorghum, oats, and corn. If there is a vegetable component in the dough mixture, then the vegetable component(s) may include one or more of potatoes and vegetable powder. Those skilled in the art will also appreciate that various other ingredients commonly found in chips or snack products might be added in addition to the grain and/or vegetable components, meat, and water and that various seasonings or toppings may be added to the chips.

The meat-infused dough mixture may be, in some forms, between 6 and 11 percent ground meat product by weight. The actual percentage of ground meat product may be, in some ingredient compositions, outside this range based on what the other constituents are as well as their morphology.

It is noteworthy that the ground meat product may be solely introduced in the extruder or just before the extruder such that the dough mixture contains no ground meat product in the mixer. Moreover, it is contemplated that the ground meat product may not dwell in the extruder for very long (i.e., the ground meat product may not dwell in the extruder for more than five minutes and, in many instances, will only be in the screw(s) of the extruder for under a minute). For example, the ground meat product may be introduced into the dough mixture just prior to a transport of the meat-infused dough mixture through an extruder screw of the extruder. This timing of ground meat introduction reduces the possible formation of bacteria due to a presence of meat in the mixer over a long duration of time. Further, the absence of the ground meat product in the mixer avoids the need for periodic sanitizing of the mixer from contact with the ground meat product and avoids potential meat-based concerns (e.g., rancidity or bacteria growth) with the content of the dough leaving the mixer. Still yet, it is contemplated that the meat-infused dough mixture may have a water activity ($A_w$) of less than 0.8 when the meat is introduced, which can help inhibit the formation of bacteria in the extruder and the extruded dough.

The step of extruding the meat-infused dough mixture from the extruder may produce a shaped ribbon of the meat-infused dough mixture for cutting. In many forms of the method, the method may then further include the step of cutting the meat-infused dough mixture after the step of extruding. The step of cooking may involve one or more heating steps including a passing of the extruded meat-infused dough mixture through an oven and frying the meat-infused dough mixture (although other cooking and heating methods might also be used). Even though the addition of meat to the chip presents a unique flavor to the chip, it is contemplated that other seasonings or coatings may be applied to the extruded meat-infused dough mixture or to the chips.

According to another aspect, a chip is disclosed made by any of the methods described above or various permutations of the aspects of the methods described.

These and still other advantages of the invention will be apparent from the detailed description and drawings. What follows is merely a description of some preferred embodiments of the present invention. To assess the full scope of the invention, the claims should be looked to as these preferred embodiments are not intended to be the only embodiments within the scope of the claims.

DETAILED DESCRIPTION

Figure 1:
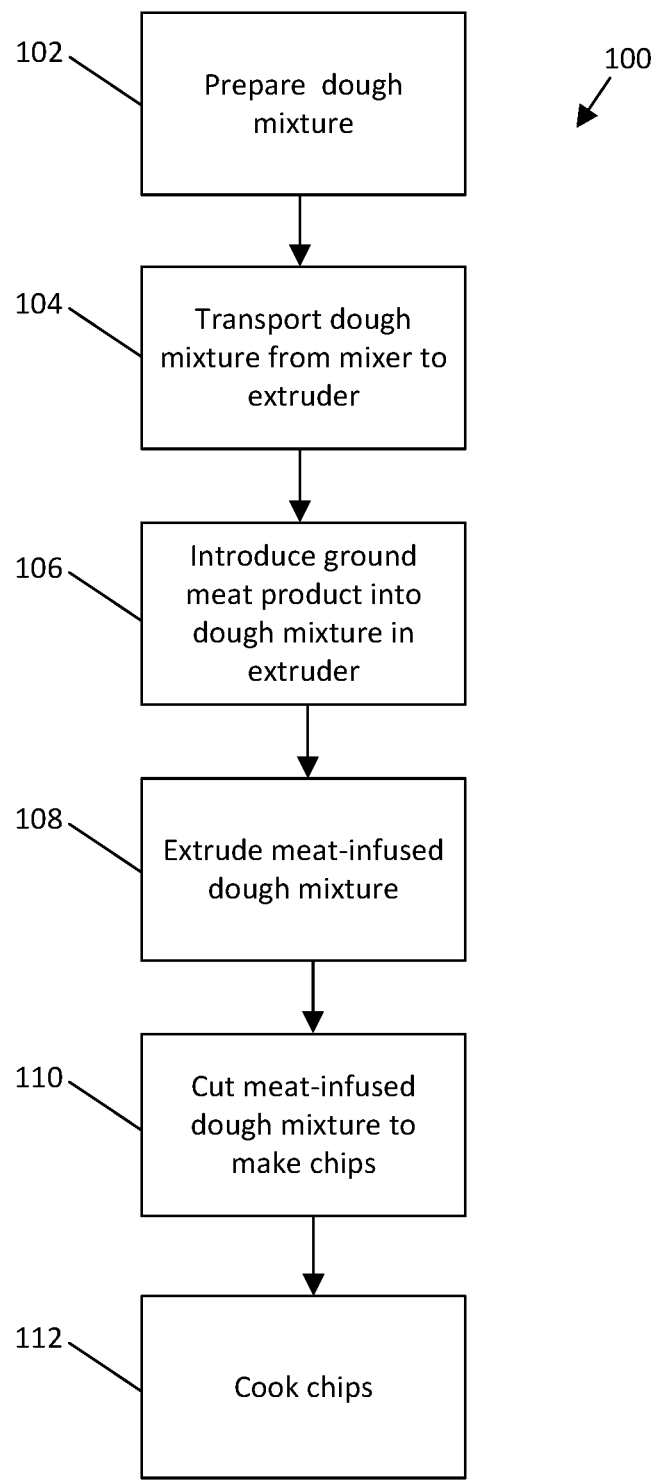
FIG. 1 is a flow chart outlining the steps for production of a high-protein chip containing meat.
Figure 2A:
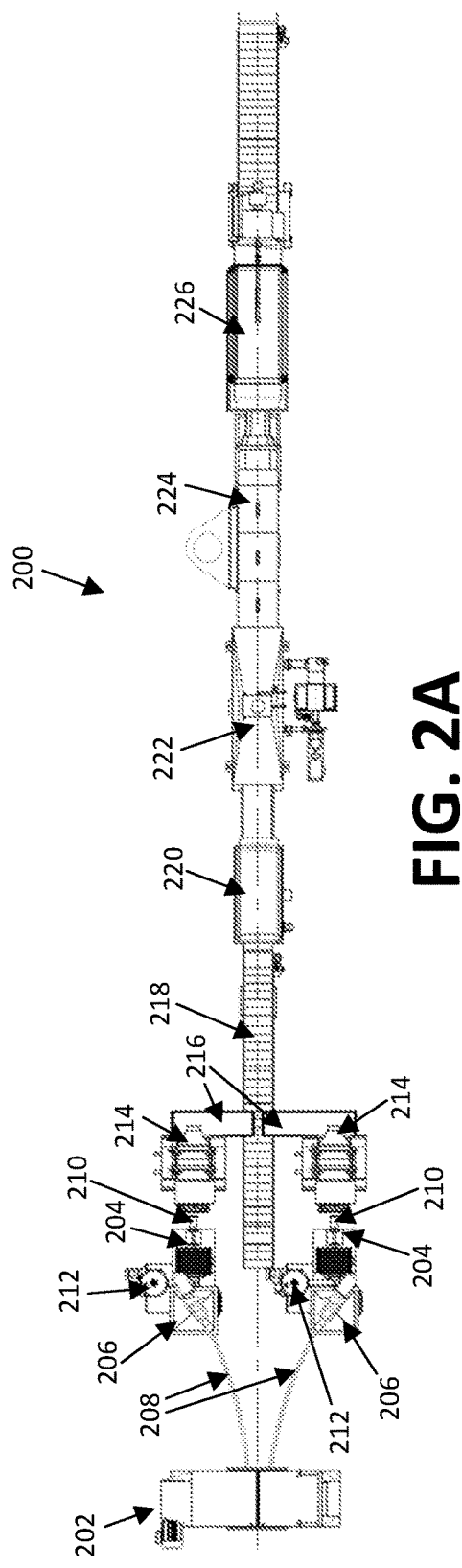
FIGS. 2A and 2B are schematics illustrating an exemplary process line for the production of a high-protein chip containing meat from the top and side, respectively.
Figure 2B:
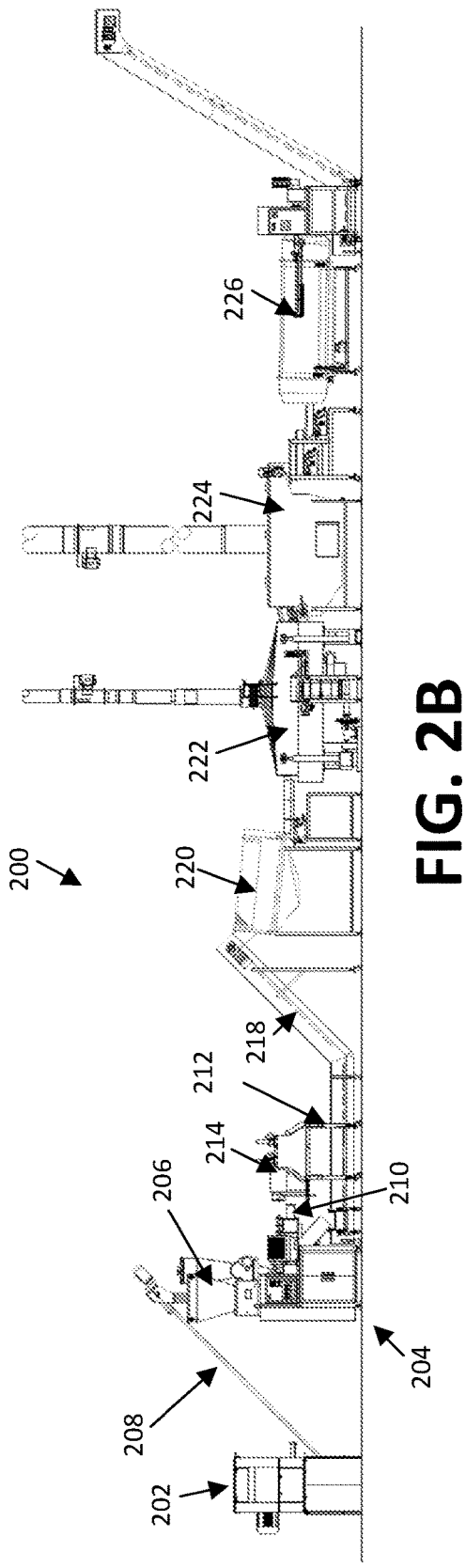

With reference being made to FIGS. 1, 2A, and 2B, an exemplary method 100 for the production of chips infused with meat as well as an exemplary process line 200 are illustrated. Below, the steps of the method 100 will be outlined and the manner in which the process line 200 can perform or implement these steps will be described in parallel.

First, a dough mixture may be prepared by mixing at least one of a grain component and a vegetable component with water in a mixer 202 according to step 102. The mixer 202 may be any one of a number of different type of mixers adapted for preparing and mixing dough. In the illustrated embodiment, the mixer 202 is a ribbon blender and, in particular, a Model 42N-18 ribbon blender produced by Charles Ross & Son Company of Hauppauge, N.Y.

At this stage, it should be appreciated that the dough mixture may have a composition resembling that of other chip products such as, for example, corn tortilla chips. In one exemplary form, the composition of the dough (after meat addition) will include 68 wt % corn meal, 10 wt % massa flour, 12 wt % sodium casine, and 10 wt % meat (which is injected at the extrusion stage). In this form, 2.5 liters of water would be added per 50 pound batch of raw materials prior to mixing.

It is contemplated that the dough mixture may include one or more grain components and/or one or more vegetable components. It is contemplated that the dough mixture may be a meal and/or grits depending on the particular dough mixture being formed. In the case in which the dough mixture contains grains, it is contemplated that the grains could include one or more of rice, sorghum, oats, and corn, although the grains are not so limited to this list. In the case in which the particular dough mixture contains vegetables, it is contemplated that the vegetables could include one or more of potatoes and vegetable powder. As those having skill in the art will appreciate, one or more types of grains and/or vegetables may be used to produce the dough mixture and, as he or she will further appreciate, there may be additional processing steps prior to mixing to prepare the grain(s) and/or vegetable(s). For example, if grain(s) are part of the mixture then, depending on the grain(s) that are provided to the mixer 202, the grain(s) may need to be soaked and cooked (sometimes in limewater or other alkaline solution as in the case of corn), washed, and/or ground before the grain(s) can be added to the dough mixture. Still yet, if there are multiple grain ingredients, each type of grain used may be prepared in a different way. In any event, the prepared grain component(s) and/or vegetable component(s) are mixed with water and potentially other ingredients to form the dough mixture.

It should be noted that, even though high-protein chip products are the end result of the method 100, there is no or substantially no meat product introduced in the mixer 202. In most mixers, there may be volumes in which the dough being blended may become relatively stagnant (i.e., not blend at a high rate and/or not readily flow out of the mixer). This may mean that some portion of the dough remains in the mixer for some length of time. Particularly since the mixing of the preparation step 102 can occur at ambient or sometimes at an elevated temperature (e.g., 90 degrees Fahrenheit), if meat were introduced in the mixer 202, then there would be substantial concerns with bacterial growth and sanitation with the presence of moisture. Among other things, the mixer 202 would need to be opened more regularly for sanitation, creating substantial downtime for the process line 200.

After the dough mixture has been mixed in the mixer 202, the dough mixture is transported from the mixer 202 (or mixers) into one or more extruders 204 according to step 104. In the particular form illustrated, the dough mixture is transported from the single mixer 202 into a pair of hoppers 206 via a flexible screw or helix conveyor 208, although other transporting or conveying mechanisms might also be used. It should be noted that prior to transporting the dough mixture out of the mixer 202, the dough mixture may be allowed to sit and steep for some duration of time (e.g., 15-20 minutes) to further let the moisture soak into the solid constituents of the dough to soften the dough and/or to better extract the flavor of the constituents.

The pair of hoppers 206 each feed a respective one of the extruders 204. In the particular form illustrated, each of the extruders 204 are an MX-650 extruder with a live bottom hopper such as may be obtained from Maddox Metal Works. Once the dough mixture is introduced into the extruder 204, it will be extruded through an extruder screw 210 (as illustrated, a single screw) through a die opening that forms a ribbon.

Notably, prior to extrusion at a meat injector 212, and just before or at the extruder screw 210, a ground meat product is introduced into the dough mixture to form a meat-infused dough mixture according to step 106. This ground meat product could be any one of a number of ground meat product or products including, but not limited to, beef, pork, poultry, and fish. Typically, the meat product is pre-cooked to improve sanitation of the process and to ensure that the downstream process cooking steps are not necessarily required in order to cook the meat. The amount of ground meat product or products introduced into the dough mixture typically would not exceed 10 percent by weight although it is contemplated that a typical range may be 6 to 11 weight percent ground meat product. At too high a percentage of meat addition, the dough mixture may lose some consistency, although it will be appreciated that given the different qualities of meat or possibility of different ingredient addition, this percentage might be driven higher. Of course, less ground meat product may also be used; however, the amount of protein addition will then likewise be reduced.

Moreover, one having ordinary skill in the art would appreciate that the ground meat may be meshed, using plates or screens having different sized openings for example, such that only ground meat particles within a certain pre-defined size range are introduced into the dough mixture at the point of the meat injector 212.

By introducing the ground meat product into the process line 200 at or just before the respective extruder screw 210, the ground meat product is able to be mixed or blended with the dough mixture within the channel in which the extruder screw 210 is disposed to form the meat-infused dough mixture during extrusion through the screw and die opening from which the ribbon extends. Moreover, by injecting the ground meat product at this point in the process line 200, it can be assured that the ground meat product will not be potentially introduced at a step at which the ground meat product could become trapped in a "dead zone" where the meat would become stagnant and bacteria could grow because the meat-infused dough mixture is immediately and fully extruded (i.e., likely on the order of magnitude of seconds, but in any event, no longer than 5 minutes assuming the process is continuously run).

While only a pair of separate extruder screws 210 are illustrated on the extruders 204, it is contemplated that each extruder 204 could have multiple extrusion screws and/or potentially multiple points of injection of ground meat into the process. Still yet, it will be appreciated that, in the illustrated embodiment, while the mixer 202 feeds two separate extruders 204 which operate in parallel, that there could be one, two, or more extruders based on relative capacities of the various components.

While it is not illustrated specifically, it is contemplated that ground meat product may be pre-cooked and/or dehydrated at the point of meat injection 212 into the extruder 204. Accordingly, it is contemplated that there may be, for example, a secondary hopper into which a pre-prepared ground meat product is placed for injection to the process line 200 or that there may be additional upstream devices in the process line that prepare the ground meat product prior to the point of injection 212. Because the processing atmosphere is relatively dry, the dry meat product (prior to introduction into the dough mixture) will not spoil very quickly in comparison to a meat product in the presence of significant moisture.

In any event, the meat-infused dough mixture is subsequently extruded according to step 108 of the illustrated method 100. It is contemplated that a ribbon-like dough extrusion having a width of, for example, 12 to 24 inches and a thickness corresponding to the desired thickness of the dough prior to cutting and cooking may be extruded. The extruder 204 may under various conditions, although typical operating conditions involve operation at 300 degrees Fahrenheit at 300 rotations per minute for the screw.

The presence of an extruder 204 in this process line 200 is noteworthy. Conventionally, extruders are not used in chip production from dough mixtures including grain-based dough mixtures. Instead, rollers are used to form thin sheets of the dough that are then cut into the shape of the chips (i.e., round or triangular shapes for example). Thus, it is not conventional to use an extruder at this stage of the process line or really at all in the production of grain-based chips of this kind.

Still yet, in addition to the non-traditional placement of the extruder in a process line for chips, it should be appreciated that the extruder performs multiple functions beyond which a single screw extruder would traditionally perform. The extruder both forms the dough for creation of the ribbon (which is subsequently cut into chips) and also uniquely mixes, blends, or works the ground meat product into the dough. For this reason, the meshing of the ground meat product can help to achieve a consistent extrudate.

After the meat-infused dough mixture is extruded from the respective extruder 204 according to step 108, the ribbon of dough can be cut into chips at a corresponding cutter 214 according to step 110. These chips may be transported using cross-conveyors 216 and an incline conveyor 218 (or other conveying devices) towards the cooking stage of the process line 200.

However, before proceeding to the cooking stage, the cut chips may be run though a tumbler 220. The tumbler 220 removes fines and other debris from the cut chips so that the fines do not advance into the fryer. If the fines advanced to the cooking stages, the fines could collect and become stagnant in the fryer and create the need for more frequent cleaning of the fryer.

Turning now to the cooking stages after the tumbler 220, in the process line 200 illustrated in FIGS. 2A and 2B, the chips cut from the meat-infused dough mixture is cooked in a fryer 224 to make the chips according to the cooking step 112 of the method 100. In the particular illustration, the fryer is a Maddox 1806 Electric Fryer in which heated oil is used to fry the chips. The as-fried chips may then be cooled by a cooler 226, such as, for example, a Maddox 24" Ambient Air Cooler.

Why frying is depicted in the illustrated embodiment, it is contemplated that this is only an exemplary cooking device and that one or more other cooking devices might alternatively be used to cook the chips made from the meat-infused dough mixture. For example, there may be a toaster oven (for example, a Model 450 Single Pass Snack Food Dryer sold by the Lanly Company of Cleveland, Ohio) followed by a fryer used to cook the chips. Any type of cooking (baking, toasting, frying, and so forth) alone or in combination with one another are contemplated as ways of cooking the chips.

Subsequent to the cooking step 112, there may be one or more seasoning of coating steps. As illustrated in FIGS. 2A and 2B, after the cooking device (i.e., the fryer 222 and the subsequent cooler 224), there is a coating tumbler 226 that may be used to apply one or more seasonings. For certain types of chips there may also be a cheese slurry system that provides a cheese coating or seasoning to the chips.

After the cooking and any coating or seasoning stages, the chips may be advanced to bagging or packaging for distribution, sale, and consumption of the product.

Thus, the process for production of a chip infused with meat is generally outlined above and an exemplary apparatus is provided. Notably, a snack chip can be produced having ground meat product added to it in which the process for making the chip does not introduce significantly heightened sanitation and maintenance issues. Also notably, the process for production of the chip includes introduction of the meat in one or more extruders, which are not typically used in the production of chips, such as corn tortilla chips, and can serve the function of both forming the dough into a ribbon for cutting and working the ground meat product into the dough.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A method of producing chips infused with meat, the method comprising:
    preparing a dough mixture by mixing at least one of a grain component and a vegetable component with water in a mixer;
    transporting the dough mixture from the mixer into an extruder;
    introducing a ground meat product into the dough mixture in the extruder to form a meat-infused dough mixture;
    extruding the meat-infused dough mixture from the extruder; and
    cooking the meat-infused dough mixture to make the chips;
    wherein the ground meat product is solely introduced in the extruder such that the dough mixture contains no ground meat product in the mixer, thereby reducing the possible formation of bacteria due to a presence of meat in the mixer.

2. The method of claim 1, wherein the ground meat product includes at least one of beef, pork, poultry, and fish.

3. The method of claim 1, wherein the grain component includes at least one of rice, sorghum, oats, and corn.

4. The method of claim 1, wherein the vegetable component includes at least one of potato and vegetable powder.

5. The method of claim 1, wherein an absence of the ground meat product in the mixer avoids periodic sanitizing of the mixer for contact with the ground meat product.

6. The method of claim 1, wherein the meat-infused dough mixture is between 6 and 11 percent ground meat product by weight.

7. The method of claim 1, further comprising the step of cutting the meat-infused dough mixture after the step of extruding.

8. The method of claim 7, wherein the step of cooking includes frying the meat-infused dough mixture.

9. The method of claim 1, wherein the meat-infused dough mixture has a water activity of less than 0.8.

10. The method of claim 1, wherein the ground meat product is introduced into the dough mixture just prior to a transport of the meat-infused dough mixture through an extruder screw of the extruder.

11. The method of claim 10, wherein the extruder screw includes only a single extruder screw.

12. The method of claim 1, wherein the step of extruding the meat-infused dough mixture from the extruder produces a shaped ribbon for cutting.

13. The method of claim 1, further comprising the step of applying a seasoning or coating to the extruded meat-infused dough mixture or the chips.

14. The method of claim 1, wherein the ground meat product does not dwell in the extruder for more than five minutes.

* * * * *